Nov. 11, 1969    A. G. SPILLETTE    3,477,510
ALTERNATE STEAM-COLD WATER INJECTION FOR THE
RECOVERY OF VISCOUS CRUDE

Filed Feb. 1, 1968    2 Sheets-Sheet 1

INVENTOR.
ARTHUR G. SPILLETTE
BY
ATTORNEY

INVENTOR.
ARTHUR G. SPILLETTE
BY
ATTORNEY 3,477,510
ALTERNATE STEAM-COLD WATER INJECTION FOR THE RECOVERY OF VISCOUS CRUDE
Arthur G. Spillette, Houston, Tex., assignor to Esso Production Research Company, a corporation of Delaware
Filed Feb. 1, 1968, Ser. No. 702,407
Int. Cl. F21b 43/24
U.S. Cl. 166—272                                                    9 Claims

ABSTRACT OF THE DISCLOSURE

A process for improving thermal efficiency and vertical conformance in a thermal process for recovery of petroleum crude wherein relatively small volumes of steam and water are alternately injected through an input well and petroleum is produced from the input well or from a separate output well.

BACKGROUND OF THE INVENTION

Field of the invention

This invention relates to the recovery of petroleum from a subterranean formation utilizing an input well for the injection of a fluid and an output well for the withdrawal of petroleum wherein the formation fluids are heated by the injection of high temperature fluid through the input well. Alternatively, the fluid may be injected into and the petroleum produced from the same well. More particularly, the invention is directed toward a method of improving the vertical conformance and thermal efficiency of a thermal process for petroleum recovery by alternately injecting small volumes of steam and small volumes of water into the formation.

Description of the prior art

Among the more promising methods that have been suggested or tried for the secondary recovery of oil from viscous oil reservoirs are those methods calling for the injection of hot water or steam into the reservoirs. In such methods, the hot water or steam is injected through one or more injection wells and forced through the reservoir by means of pressure.

In the hot water method, water at an elevated temperature is injected under considerable pressure into an oil-bearing formation. The heated water increases the temperature of the petroleum in the reservoir, decreasing its viscosity and increasing its mobility. The injected water drives the heated oil to a production well. Ultimately, oil and water are recovered at the producing well and the process is continued until the production of oil is no longer economical.

The steam method of recovery is somewhat similar to the hot water method in that a heated, aqueous medium is moved through the reservoir to heat the petroleum and displace it to a production well. The steam method is, however, materially different from the hot water method in several respects. The major differences arise due to the difference in state of the two fluids. Steam is gaseous; water liquid. Due to the gaseous state of steam, it is capable of distilling certain of the more volatile constituents of the petroleum and thereby recovering these constituents more effectively. Steam is also a more effective heat carrying medium than water, pound for pound. Steam not only carries sensible heat but also can release its latent heat of vaporization upon condensation.

A major disadvantage of both steam and hot water injection lies in the tremendous amounts of heat and fuel that they require. In this connection, it will be recognized that only a small part of the injected heat serves to heat oil, while the great bulk of the heat is consumed in heating the porous rock structure of the reservoir. It will also be recognized that substantial quantities of heat are lost to earth strata that surround the reservoir structure. Another important factor which contributes to high heat losses in the steam process is the extreme temperatures of high pressure steam. At the high pressures at which steam must often be injected, it is necessary to increase the temperature substantially to keep the fluid in its gaseous or vapor state. These high temperatures often exceed the temperature levels necessary for efficient recovery of the viscous petroleum. As a consequence, the reservoir fluids and rock are heated beyond the level necessary for efficient recovery. Also the high temperature steam accentuates the thermal losses to adjacent formations since the magnitude of heat transfer is a function of the temperature differential between the formations. Thus, while the hot water and steam drive processes both appear technically sound for use in oil reservoirs, they are often uneconomical since their heat consumptions or losses are excessive.

One method which has been suggested for overcoming the major disadvantages of the steam and hot water injection processes is following the high temperature fluid with a cooling medium such as gas or cold water to reclaim the sensible heat of the formation from the area where the fluid has removed the recoverable oil and to carry this reclaimed heat to an area which is still unheated. This method is successful in transferring heat from an area where it is no longer usable to an area where it will assist in the recovery process.

A major problem associated with such a process, however, is the lack of vertical conformity of the thermal front. In the steam injection process, as the steam front moves away from the injection well, there is a tendency for gravity segregation to occur since the gaseous steam is lighter than the reservoir oil. This gravity segregation of the steam is commonly known as "overriding" and this effect becomes more pronounced as the steam moves radially away from the injection well. If only steam is injected, it will ultimately be localized at the top of the formation and prematurely break through to the producing well. This premature break through will cause a highly conductive flow channel for the steam at the top of the formation and further injected quantities of steam will flow through the zone of high steam conductivity bypassing major quantities of reservoir fluid. While large quantities of heat are introduced into the reservoir, only a fraction of this energy is transferred to the reservoir oil where it can be used to lower viscosity and increase mobility. In addition to removing the introduced thermal energy from the main body of the reservoir oil where it is needed, overriding of the steam front causes excessive transfer of heat into adjacent, unproductive formations which results in poor thermal efficiency.

Where steam is followed by a bank of cooling water, the vertical nonconformance is reversed. Since the water is normally heavier than the reservoir oil, there will be a displacement of the water to the bottom of the formation where it will tend to "underride" and bypass a major portion of the petroleum in the reservoir.

Underriding of the injected water is a problem which also occurs in the hot water-flooding process. Generally, the lack of vertical conformance is not quite as pronounced during underriding since the density difference between oil and water is normally less than the difference between oil and steam. Nevertheless, the same forces are at work to cause vertical nonconformity, high thermal losses to adjacent formation, and channeling of high temperature fluids to the producing well.

BRIEF SUMMARY OF THE INVENTION

This invention provides a method of improving the thermal efficiency and vertical conformance in a thermal process for petroleum recovery. The method utilizes small, alternate banks of steam and water to more effectively distribute thermal energy throughout the reservoir. A small bank of water following a small bank of steam tends to counteract the effect of steam overriding. A following steam bank tends to counteract the effect of water underride. Sequential addition of steam and water during the recovery process will minimize vertical nonconformance of the thermal front as it passes through the reservoir.

The sequential injection also assists in improving the thermal efficiency of the steam injection process by reducing the temperature of the heated formation to a more efficient level for thermal recovery. Not only is the injected heat more effectively utilized but the losses to adjacent formations are reduced due to a lower overall temperature level in the oil-bearing formation.

DESCRIPTION OF THE PREFERRED EMBODIMENTS

Figure 1:
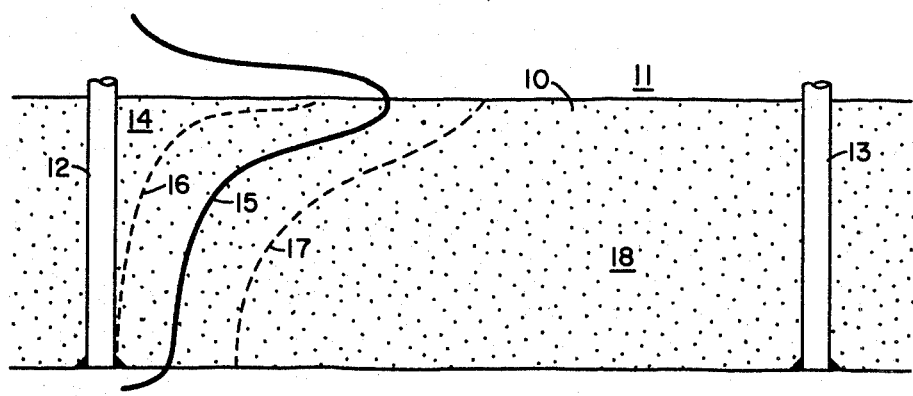
FIGURE 1 illustrates a vertical section of a reservoir showing the zone of steam saturation and a 150° F. isotherm after a small bank of steam has been injected.

The invention may better be understood by reference to the drawings. Referring first to FIGURE 1, a reservoir 10 in a section of earth 11 is penetrated by an injection well 12 and a withdrawal well 13. Steam has been injected through input well 12 and has saturated a small portion 14 of the reservoir. Withdrawal of the fluids through well 13 causes a pressure drop within the formation between the point of high pressure at the injection well 12 and the point of low pressure at the withdrawal well 13. This pressure drawdown coupled with gravity segregation of the steam and reservoir fluids causes the thermal front to assume a configuration which is approximated by the shape of a 150° F. isotherm, 15. For purposes of illustration the reservoir is assumed to have an original bottomhole temperature of 100° F.

In the zone where the steam and oil are mixing, two forces are operating on the steam. The pressure drawdown between wells 12 and 13 tends to move the steam in a horizontal direction from the injection well and toward the withdrawal well. The density differential between the oil and the steam tends to move the steam upward in a vertical direction. As a result when the steam moves away from the injection well, it tends to sharply override the formation oil and to extend from the injection well in a thin, outwardly-expanding zone of high steam saturation.

Following initial steam injection, three major regions exist in the reservoir. There is a zone of high steam saturation 14 around the wellbore which extends outwardly toward the withdrawal well as it overrides the formation oil. The second region lying between lines 16 and 17 is a zone of heated, mobile oil annularly disposed around the steam saturated zone. The third region 18 is the unheated portion of the reservoir containing oil at or near the original bottomhole temperature.

Figure 2:
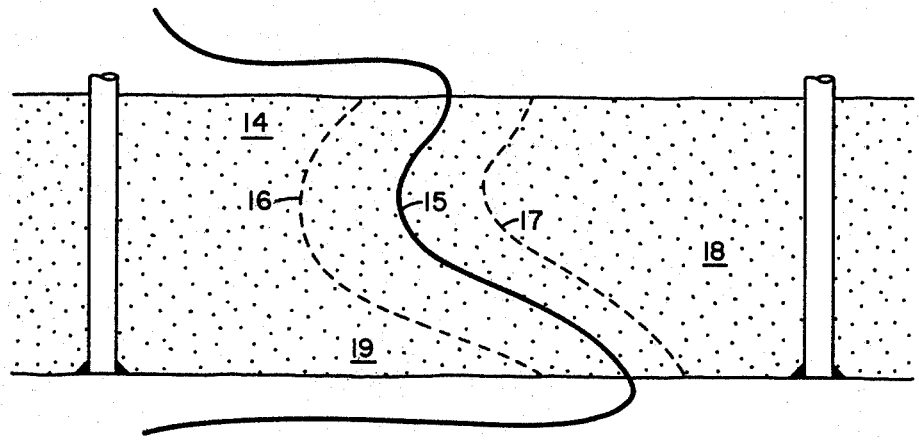
FIGURE 2 illustrates the same reservoir after a small bank of water has been injected.

As shown in FIGURE 2 when water is injected following the steam bank, the water begins to underride. While the density of the steam is less than that of the reservoir oil, the density of the water is higher. Due to its higher density, the water will pass through the steam and heated-oil saturated zones, move radially outward toward the withdrawal well and saturate a region 19 at the lower portion of the formation. This underriding of the injected water will tend to flatten out the leading edge 17 of the thermal front. If water is continuously injected following steam injection, underriding of the water bank will create a reversal of the vertical nonconformity, i.e., oil will be trapped at the top of the formation and bypassed by the flooding medium. This underriding is shown in FIGURE 2 by the outline of the 150° F. isotherm.

Figure 3:
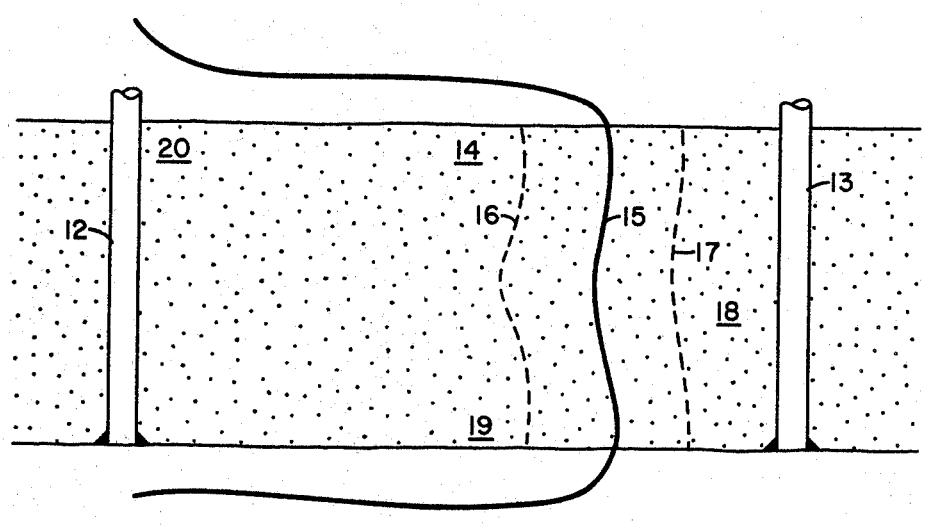
FIGURE 3 illustrates the same reservoir after a second bank of steam has been injected.

Subsequent injection of steam will counteract the underriding caused by the injected water bank. Referring to FIGURE 3, the zone of steam saturation will be enlarged due to injection of a second volume of steam 20. The enlarged steam zone will be localized toward the upper portion of the reservoir. As shown by the 150° F. isotherm, the second bank of steam will create a more nearly vertical thermal front as the injected fluid moves from the injection well to the producing well, thereby thermally sweeping the formation in a more efficient manner.

Figure 4:
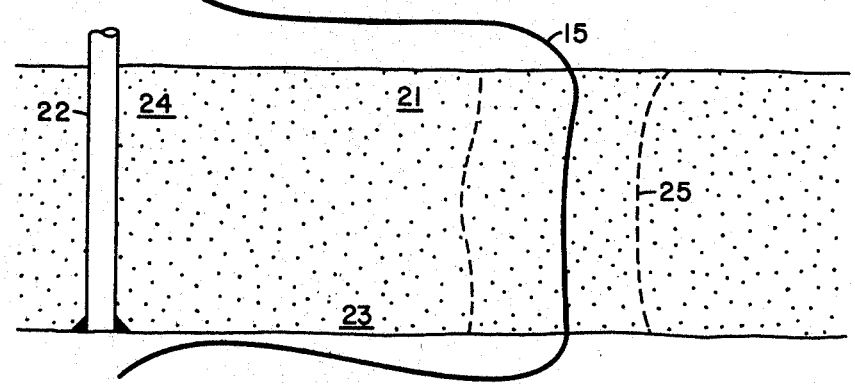
FIGURE 4 illustrates another vertical section of a reservoir showing the use of the invention to stimulate a well.

As shown in FIGURE 4, the method may also be employed to stimulate production from a well used for both injection and production. A small bank of steam 21 is injected through well 22 into the oil-bearing formation where it tends to localize at the upper portion of the reservoir. Subsequent injection of a small water bank 23 followed by a second small steam bank 24 will produce a more nearly vertical thermal front 25. Following injection of the fluids, well 22 is opened to production and steam, water, and heated oil are produced.

One of the more surprising aspects of this invention is the benefit arising from steam injection subsequent to water injection. In the prior methods, water has been injected following steam simply to scavenge heat from those areas of the reservoir where it had served its function and to transfer this heat to areas of the reservoir still containing low temperature, recoverable oil. None of the prior methods, however, have suggested the introduction of thermal energy into an area where the waste heat had already been reclaimed. As shown herein, this procedure produces surprising advantages.

Ideally water injection should be started as soon as the preceding steam bank begins to override in the formation to any substantial degree. Where the oil-producing field is completed with temperature survey wells between injection and production wells, overriding can be detected early and easily. A sharply higher temperature at the top of the formation compared to the bottom is the best indication that the steam front is overriding. Where temperature survey wells are not present, the time at which overriding is likely to occur can be estimated using known mathematical procedures or prior field experience. Such estimates could also be employed where the method is used for stimulation of a well. Furthermore, a premature rise in the temperature of the produced fluids is indicative of channeling of the steam at the top of the formation and measurement of the temperature of produced fluids can be used to determine the proper time to change from steam injection to water injection. Underriding of the water bank may be determined in a similar manner, and comparable methods may be used to determine the proper time to begin a steam cycle following water injection.

It is not critical to the practice of this invention that a bank of water or steam be injected as soon as the prior bank begins to override or underride. Substantial benefits can be obtained by alternating small banks of steam and water even if substantial overriding or underriding has occurred prior to injection of the alternate fluid. The process is self-corrective to a certain extent. If overriding has occurred during steam injection, a following bank of water will alleviate this tendency. If underriding has occurred, a following bank of steam will tend to make the thermal front more nearly vertical. Therefore, the invention may be practiced and its benefits obtained even though no measurements are made at the surface to indicate the occurrence of overriding or underriding.

It is preferable to use relatively small banks of steam and water to prevent any extreme tilting of the thermal front before the alternate fluid is injected. The volume of a single steam bank expressed as condensate should not ordinarily exceed 10 percent of the pore volume of the reservoir volume to be flooded and preferably should be approximately 5 percent. The water banks should be approximately the same size as the steam banks.

When the method is used for oil recovery between an input and output well, alternate banks of approximately 5 to 10 percent pore volume of steam and water are continued until from about 25 percent to 100 percent pore volumes of steam have been injected. Following injection of the final steam bank, water is continuously injected to drive the steam, hot water, and reservoir fluids to the producing well. Water injection is continued until an economic limit of producing water-oil ratio is reached.

When the method is used as a single-well, stimulation technique, the volumes of the steam and water banks are again approximately 5 to 10 percent of the pore volume of the reservoir volume to be swept. However, as is usual in steam stimulation procedures, the total volume of fluid injected prior to the production cycle will be less than the amount injected in a steam-drive recovery process. This naturally follows since the reservoir volume swept in a stimulation treatment is generally smaller than the volume swept in a steam drive technique. However, the volume of steam injected in the stimulation technique expressed as a percentage of the reservoir volume swept will be the same. Thus, in the use of this method in well stimulation, steam and water are introduced during a single stimulation cycle until the total amount of steam and water desired for the treatment have been injected. The well is then placed on production and the reservoir oil and injected fluids are withdrawn. The stimulation cycle may be repeated until the economic limit of this method is reached.

The steam bank fluid may be superheated steam or a mixture of steam and water vapor. Mixtures of steam and water vapor are normally characterized by the weight percent of dry steam which is called the quality of the steam. Thus, a mixture of 80 percent dry steam and 20 percent water vapor would be called 80 percent quality steam. In the practice of this invention, it is preferred to employ steam with a quality of 75 percent or greater in the steam bank.

The water bank fluid may be unheated water, hot water, or low quality steam. For matters of practicality, it probably would be desirable to employ steam of approximately 80 percent quality in a steam bank and any available water in its naturally existing, unheated state in the water bank. Most oil-field steam generators can economically produce steam of 80 percent quality. Use of available water at its existing temperature obviates the need for heating the water. Heated water will, of course, carry more energy into the formation and may be used where heating fuel is readily available and inexpensive.

The only essential characteristics of the two fluids is that they have a substantial density differential. The density differential may be due to a difference in composition of the two fluids or may be due to a difference in temperature of the two fluids where they have the same composition. Superheated steam and water at its natural surface temperature will have a high density differential. However, extremely high-quality steam or superheated steam is expensive to produce due to higher fuel consumption per pound of steam produced and higher investment cost for the high-temperature, high-pressure steam generators necessary to produce superheated steam. In most instances, economics will dictate the use of steam with a relatively high water content, i.e., 75% to 85% quality steam.

Either fluid may be injected first. In some instances, it may be desirable to inject a first bank of heated water to increase the reservoir's relative permeability to water. This water bank will be followed by the sequential addition of small volumes of steam and water. Generally, however, it will be preferable to employ a small volume of steam as the initial bank to obtain a greater initial temperature increase of the reservoir fluids.

What is claimed is:

1. A thermal method for petroleum recovery from a subterranean formation comprising:
   (a) injecting into an input well in the formation a quantity of a first fluid having a temperature greater than the original bottom-hole temperature of the formation;
   (b) thereafter injecting into the input well a quantity of a second fluid having a density different than the density of the first fluid;
   (c) thereafter injecting into the input well a second quantity of the first fluid so that leading edge of the injected fluids is more nearly vertical; and
   (d) recovering petroleum from the formation.

2. A method as defined in claim 1 wherein the first fluid is steam and the second fluid is water.

3. A method as defined in claim 1 wherein the first fluid is water and the second fluid is steam.

4. A method as defined in claim 1 wherein the quantity of the first fluid is from 5 percent to 10 percent of the pore volume of the reservoir volume to be swept.

5. The method as defined in claim 1 wherein the quantity of the second fluid injected is from 5 percent to 10 percent of the pore volume of the reservoir volume to be swept.

6. The method as defined in claim 1 wherein the second fluid is injected after overriding of the first quantity of the first fluid has been indicated.

7. The method as defined in claim 1 wherein the second quantity of the first fluid is injected after underriding of the second fluid has been indicated.

8. A method for improving the vertical conformance and the thermal efficiency of a steam flooding process for the recovery of petroleum from a subterranean formation having an input well and an output well comprising:
   (a) injecting through the input well a 5 percent to a 10 percent pore volume bank of steam;
   (b) thereafter injecting through the input well a 5 percent to a 10 percent pore volume bank of water;
   (c) repeating steps (a) and (b) until about 25 percent to about 100 percent pore volumes of steam have been injected;
   (d) thereafter injecting water through the input well to drive the reservoir fluids to the output well; and
   (e) recovering petroleum from the formation.

9. The method as defined in claim 8 wherein steps (b) and (c) are performed after vertical nonconformance of the preceding injected bank is indicated.

References Cited

UNITED STATES PATENTS

| | | | |
|---|---|---|---|
| 2,927,637 | 3/1960 | Draper | 166—9 |
| 3,042,114 | 7/1962 | Willman | 166—40 X |
| 3,080,917 | 3/1963 | Walker | 166—9 |
| 3,193,009 | 7/1965 | Wallace et al. | 166—11 |
| 3,244,228 | 4/1966 | Parrish | 166—9 |
| 3,353,598 | 11/1967 | Smith | 166—11 |

STEPHEN J. NOVOSAD, Primary Examiner